3,322,487
APPARATUS FOR TAKING COMPOSITE PICTURES BY PHOTOGRAPHY WITH BACKGROUND PROJECTION AND ILLUMINATION OF THE OBJECT
Eduard Renner, Feuerbach Strasse 12, Frankfurt am Main, Germany
Filed Sept. 13, 1966, Ser. No. 579,107
Claims priority, application Germany, Sept. 15, 1962, E 23,530
7 Claims. (Cl. 352—89)

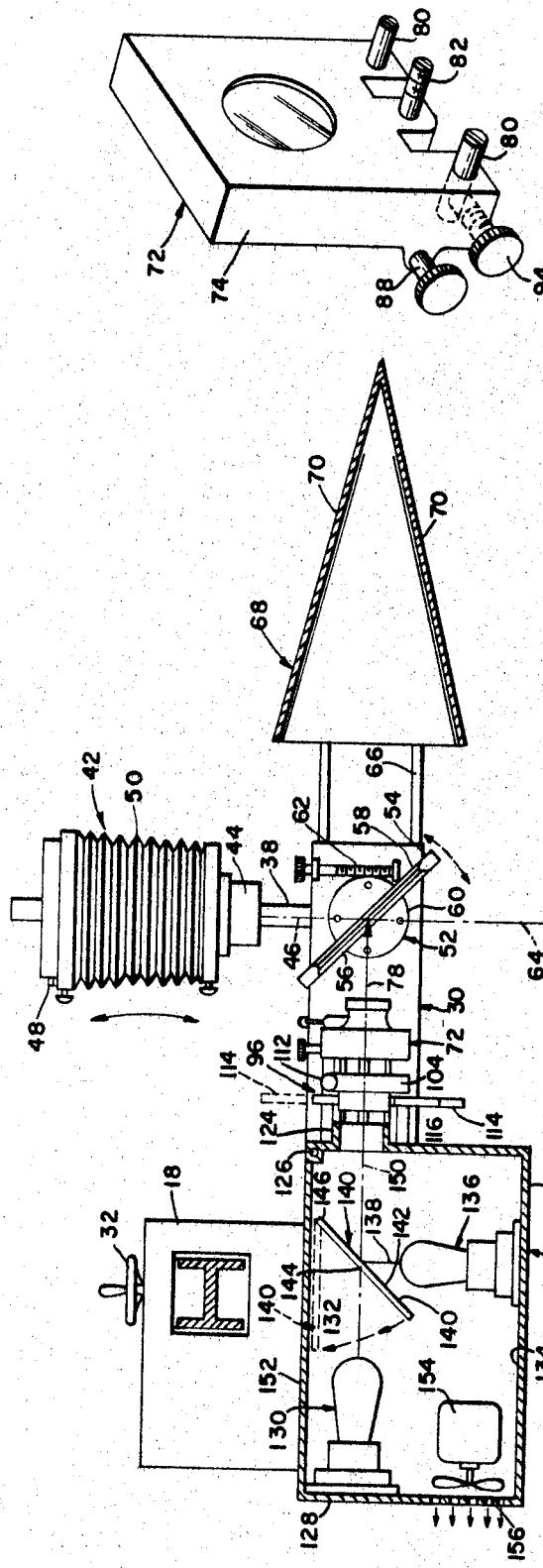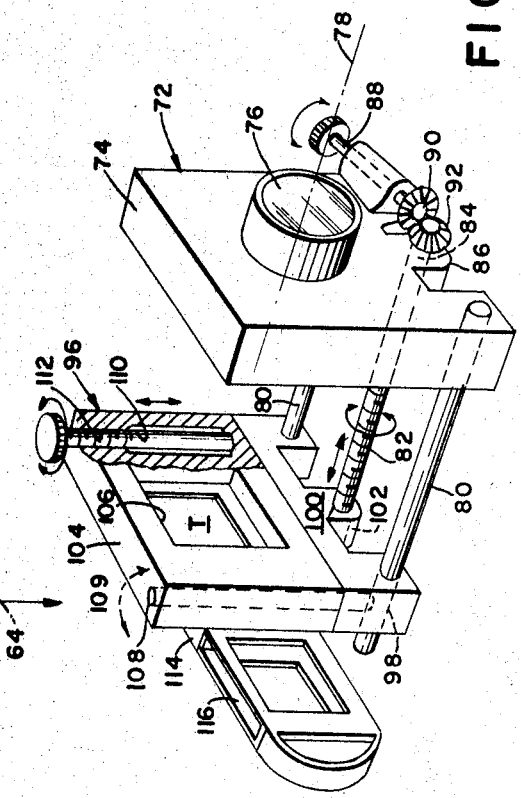

ABSTRACT OF THE DISCLOSURE

This invention relates to a system for taking a composite photograph of an object and an artificial background projected onto a screen behind the object by components all mounted on a single platform, including a light projector wherein both a pilot and flashlight can be alternatively projected along a single light emission axis coincident with the focal axis of a projection lens used to project the background which is viewed by a camera lens through a semi-transparent mirror.

---

This application comprises a continuation-in-part of copending application Ser. No. 308,781, filed Sept. 13, 1963, and now abandoned.

This invention relates to improvements in a system for producing composite pictures i.e. where an artificial background is projected onto a screen behind an object being photographed, and the improvements are adapted for use in all types of photography including flash type stills, moving pictures and kaleidoscopes.

The prior art recognizes the use of a projected background onto an autocollimating screen; however, the correlations of artificial light intensity and the focusing of a camera lens in relation to transparency projection intensity has generally involved a "trial and error" procedure which was not conducive to efficiency and accuracy, where a plurality of backgrounds were to be used and/or different compositions for a single subject were to be used, each of the cooperating components of the prior art had to be readjusted and reoriented to compensate for changes.

A primary object of the present invention is to provide an improved system in which a single optical platform has mounted thereon all of the components for "taking" a composite picture, and all of the components remain in substantial relative adjusted relationship for "taking" subsequent composed composite pictures.

Another object of the present invention is to provide in a system for taking composite pictures in conjunction with an autocollimating screen, a novel arrangement of cooperating components all mounted on a single optical platform whereby a pilot light is initially used to project a background in its optimum relationship and a flashlight of increased intensity can be projected to illuminate a subject being photographed in front of the background which is being simultaneously projected.

A further object of the invention in conformance with that set forth above is to provide a novel light projector including means whereby the light-emission axes of both a pilot and flash light can be alternatively projected coincident with the focal axis of a projection lens used to project a transparency background onto a semi-transparent mirror used to reflect a background onto a screen which is viewed by a camera lens through the semi-transparent mirror.

A still further object of the invention in conformance with what has been set forth above, is to provide means whereby background shadows are minimized, pilot and flash light ray emission axes are disposed in intersecting relation with respect to a reflection axis of a mirror in a light projector which is used to direct light rays onto a background transparency to be focused onto a second reflecting mirror through which a picture is to be "taken" by means of a camera lens.

Still further objects of the present invention in conformance with what has been set forth is to provide novel means for cooling and maintaining the adjusted interrelationship between previously adjusted components and focal and reflection axes of the system, to provide a cooperating light absorber to minimize excess light reflection of rays used to project a background transparency and illuminate a subject forming a composite picture; to provide a displaceable mirror means in a light projector means in which the mirror is utilized to alternatively reflect both pilot and flash light rays; to provide means to permit substantially all inter-related components to be mutually adjustable whereby optimum adjusted inter-relation can be obtained and continuously maintained without appreciable subsequent adjustment; and to provide means whereby all of the components are mounted on a vehicular stand.

These together with other and more specific objects and advantages will become apparent from a consideration of the accompanying specification when taken in conjunction with the drawing forming a part thereof and in which an exemplary embodiment is described, in which:

FIG. 3 is an enlarged rear elevational view, essentially diagrammatic, and looking substantially from the plane of line 2—2 of FIG. 1;

FIG. 4 is an enlarged horizonal sectional view taken substantially on the plane of line 4—4 of FIG. 3;

FIG. 5 is an enlarged fragmentary perspective view, with portions broken away, and shows details of the projection lens means and transparency holder means; and FIG. 6 is an enlarged fragmentary perspective view of the projection lens means looking at the side opposite that shown in FIG. 5.

Figure 1:
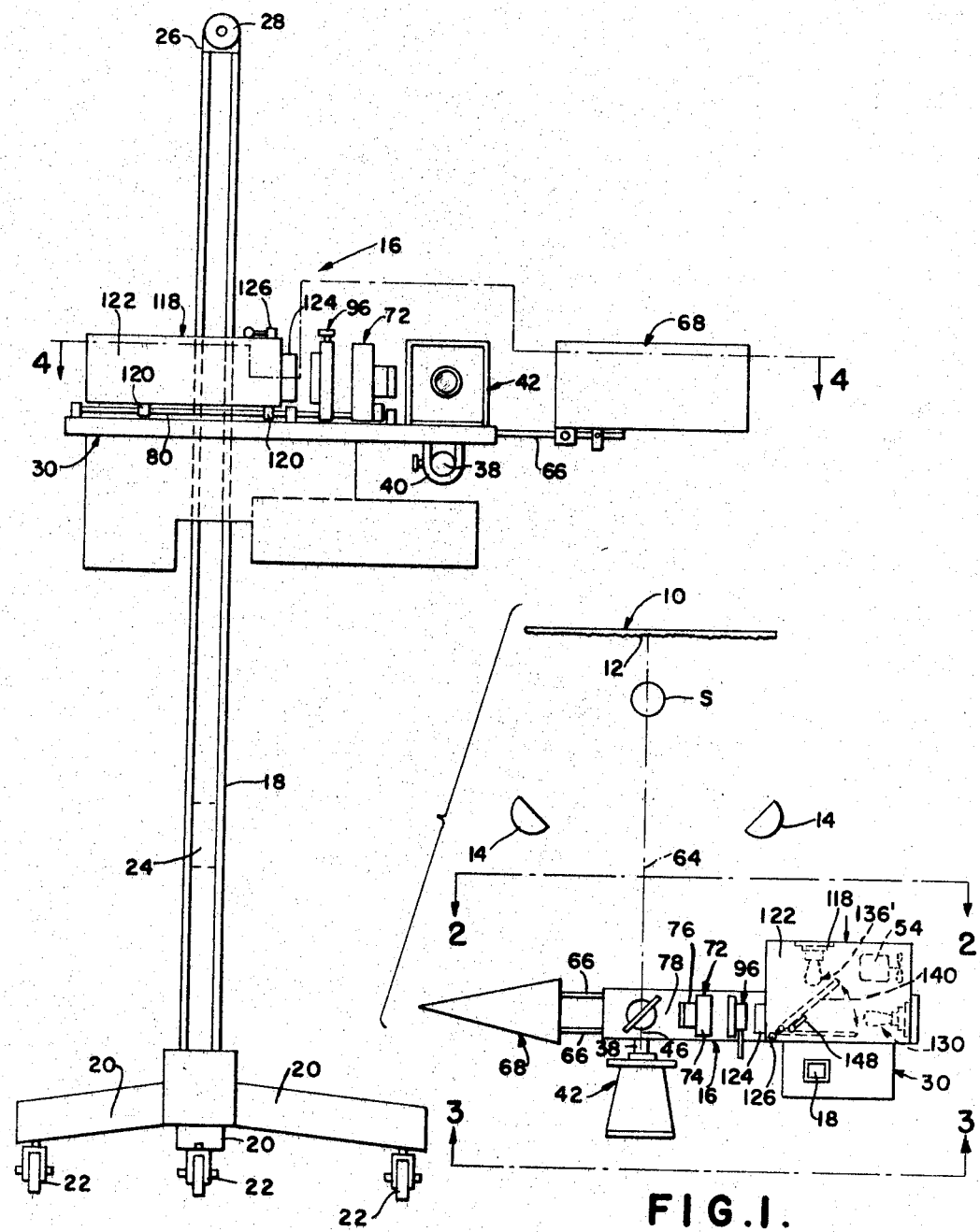
FIG. 1 is a diagrammatic plan view showing generally the components of the system in relation to a screen and subject to be used to compose a composite picture.

Referring to the drawing in detail and first considering FIG. 1, an autocollimating screen is indicated generally at 10 and includes a reflecting surface 12 which will reflect light rays substantially in the direction of incidence. The screen will have projected onto the surface 12 a background which in conjunction with a subject S will provide a composite picture. Disposed laterally, out of camera view, are suitable back lights 14 which are used to supply foreground lighting and to supplement flash light means which will subsequently be described in detail.

Disposed in front of the reflecting surface 12 of screen 10 is a support stand indicated generally at 16 and which is preferably vehicular in the illustrative embodiment. The support stand 16 comprises a vertical column 18 having lower radially extending feet 20 including lower caster wheel assemblies 22. Counterbalanced on the column 18 by means of a suitable weight 24 in the column and cable 26 attached to the weight and entrained over a sheave 28 journalled at the top of the column 18, is an optical platform 30. Suitable bearings (not shown) are provided to permit ready adjustment of the platform. A lock screw 32 engageable with a portion of the column is provided for securing the platform 30 in a vertically adjusted position.

The platform 30 may include storage compartments for film packs, plates spare parts, etc., as indicated at 34, and includes thereon a control manifold 36 which will include pilot light and flash light controls as well as rheostat means for controlling the current flow to these lights. Although the exact functional and structural details of these controls is not shown, it is clearly apparent that the controls will be in a readily accessible and convenient position for the purpose of controlling the lights and current to both the lights just mentioned as well as synchronizing energization of the back lights 14.

The optical platform 30 has mounted thereon a support 38 to which is adjustably mounted at 40 camera means indicated generally at 42. The camera means is to be considered in its broadest context and could include a still movie or kaleidoscope type camera. The camera means 42 includes an object or viewing lens 44 having a focal axis 46 directed toward the screen surface 12 and subject S in the usual manner. The camera means includes a plate holder 48 and bellows 50 for focal adjustments.

Mounted forwardly of the camera lens means 44 is a semi-transparent mirror means indicated generally at 52 and comprising a vertically disposed mirror 54 having a reflecting surface 56 at the side farthest from the camera lens; however, the side 58 will permit light rays to penetrate through and be reflected back to the lens 44. The mirror 54 is adjustable, to a slight degree, about a vertical axis and in this regard includes a toothed hub 60 meshed with a manually adjustable worm gear 62 suitably journalled on the platform 30. The mirror 54 has a reflection axis 64 which will substantially coincide with the focal axis 46 of the lens 44, and the toothed hub 60 and worm gear 62 are used to adjust coincidence of the aforementioned focal and reflection axes 46 and 64, respectively.

The platform includes a pair of laterally projecting parallel support rails 66 or the like, upon which is adjustably mounted light trap means 68. The light trap means 68, as clearly seen in FIG. 4, comprises a tetrahedron opening toward the mirror 54 and the opposed sides 70 may have a coated inner surface and are so oriented and angularly related to each other that projected light rays passing through the mirror 54 will be substantially absorbed or re-reflected to prevent light rays from materially affecting the picture being taken. Although the lateral adjustments of the light absorbing means 68 are mentioned generally, it will be appreciated that such adjustments can be conveniently and readily accomplished.

Indicated generally at 72 is projection lens means disposed in opposed relation to the light trap means 68 with the mirror means 52 disposed therebetween. The projection lens means 72 includes a housing 74 in which a lens 76 is mounted, the lens 76 having a focal axis 78. The focal axis 78 of the lens 76 will be adjusted to intersect the focal axis 46 of lens 44 and reflection axis 64 of the mirror 54. Suitable means are provided for focusing the projection lens 76 and conveniently comprising a pair of mutually parallel guide rails 80 mounted on platform 30, and an adjusting screw 82 threaded in a threaded bore 84 formed in a lower hub portion 86 of the housing 74. A manually rotatable, suitably journalled shaft 88 includes a bevel gear 90 meshed with a gear 92 at the end of the screw 82. A lock screw 94 is provided in one side of the housing 74 for engaging one of the rails 80 to retain the lens means in its adjusted focused position relative to the mirror 54 and a transparency holder means indicated generally at 96 and also supported on the platform 30.

The transparencey holder means 96, as most clearly seen in FIGS. 4 and 5, include spaced, mutually parallel bore portions 98 formed in a suitably conformed base 100. The base is reciprocably supported on guide rods or rolls 80, and the threaded rod 82 can be threadably received in an internally threaded bore 102. When the rod 82 is rotated by the manually controlled rod 88, the projector lens means 72 and transparency holder means will have relative movement toward and away from each other.

The base 100 has supported thereon an adjustable frame 104 apertured at 106, and includes a vertical bore 108 journalled on a pivot pin 109 which is terminally enclosed at its lower end in the base 100. The frame 104 can be adjustably pivoted in any suitable manner, so that the frame 104 can be adjusted for parallelism with respect to the projector lens means. Another bore 110 has an abutment screw 112, the terminal end being engageable with the underlying surface of the base 100. Manual rotation of the abutment screw 112 will result in raising and lowering of the frame 104, and thus selected portions of a transparency background can be projected onto the lens 76.

The frame 106 has mounted on the rear thereof a suitable transparency holder frame 114 which is reciprocably supported on suitable transverse tracks (not shown) whereby the frame 114 can be used to hold two background transparencies; note alternative transparency recess 116.

It will be noted that the transparency holder means 96 and projector lens means 72 are in spaced relation from each other and thus conduction heat is minimized.

Figure 2:
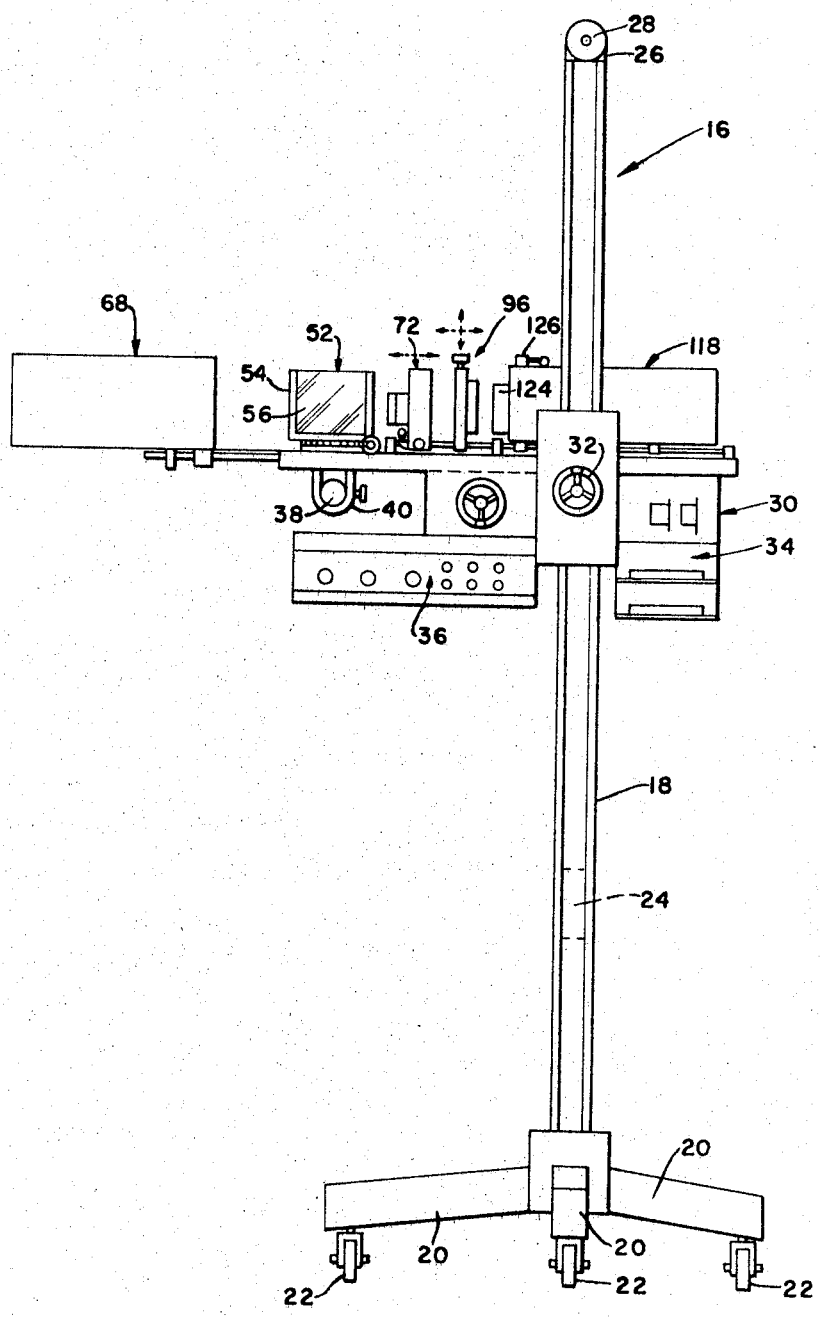
FIG. 2 is an enlarged front elevational view, essentially diagrammatic and looking substantially from the plane of line 2—2 of FIG. 1.

Disposed in spaced relation from the transparency holder means 96 is light projector means indicated generally at 118, which is reciprocably mounted by means of suitable support bracket sleeves 120 on the rails or rods 80; see FIGS. 2 and 3, for example. The light projector means 118 comprises a housing 122 and includes an open collar 124 opening directly onto the transparency T which will be projected through the opening 106 of frame 104 onto the lens 76 and to the reflecting surface 56 of the mirror 54 along the focal axis 78 of the lens 76. Suitable means, i.e. a lock screw 126 operatively connected to one of the rails 80 (details not shown) is provided on the housing 122 to retain the housing in a relatively fixed adjusted position.

Suitably mounted on the rear wall 128 of the housing 122 is a flash light means 130 which may comprise an electronic type light source of extremely high intensity. The flash light means 130 has a light emission axis 132 substantially coincident with the focal axis 78 of the lens 76. Mounted in any suitable manner, on the inner surface of side wall 134 is a pilot light means 136 having a light emission axis 138 substantially perpendicular to and intersecting the light emission axis 132 of the flash light means. Disposed in intersecting relation to the light emission axes 132 and 138 is a second mirror means 140 which is preferably positioned at 45° with respect to the aforementioned intersection of axes 132 and 138. The second mirror means can comprise a semi-transparent mirror, i.e. side 142 would be a reflecting surface while surface 144 would permit light rays from flash light means 130 to pass therethrough. On the other hand the mirror means can comprise a conventional mirror and in this event, the mirror means 140 is mounted on a vertical shaft 146 or pivot axis, and the shaft 146 projects out of the housing 122 and has secured thereto a control lever 148; see FIG. 1 generally oriented in the direction of the general plane of the mirror. The control lever 148, regardless of what type mirror is used, can be used to orient the reflection axis 150 of the mirror means into substantial coincident relationship with the light emission axis 132 of the pilot light means and focal axis 78 of the lens 76.

When a conventional mirror means is used, i.e. the type not permitting light-ray penetration, the mirror means will be oriented adjacent the inner surface of wall 152 of the housing through the use of the control external lever 148.

Suitably mounted in the housing 122 is a power driven exhaust fan 154 or the like which exhausts air through an opening 156 in the wall 128 of the housing; see FIG. 4. Cooling air will be drawn around the projection lens means 72 and transparency holder means 96 through the open collar 124 toward the mirror means 144 and over the pilot light means 136 and out of opening 156. The size of the opening 156 in relation to the collar opening is so proportioned to cause cooling air to move at a relatively high velocity and the pilot light will be substantially cooled due to the angular baffling of air provided by the angularly disposed mirror means. Not only is cooling desirable, but it is important so that component expansion is uniform or minimized so that adjustments are retained and/or the light emission axes, focal axes, etc. are maintained in adjusted alignment.

A fixed ratio is arranged between the light intensity of the pilot light 136 and the flash light 130 so that once the camera is adjusted utilizing the pilot light and a standard light exposure meter, the equipment is in condition for use with the flash light projector, so that errors in the adjustment are substantially completely eliminated.

The intensity of the back lights 14 for the foreground light and of the flash light projector for the background are so matched in relationship to each other to permit perfect composite pictures to be taken.

The sizes of the pilot and flash light bulbs are such that the projection lens 78 will be completely filled with the background provided by the transparency. Further, these bulbs are of such a rating to afford greater than maximum requirements for projection of the background to completely fill the projection lens. Further, suitable adjusting rheostats are provided in the circuits in which the flash light and pilot light are connected so that the light ray intensity can be adjusted.

Additionally, suitable reflectors can be provided behind both the pilot and flash lights so that reflected light can also be used in conjunction with the light rays emitted by the respective lights to supplement and increase the amount of light provided by the respective flash and pilot lights.

*Brief review of salient features*

First, the use of an autocollimating screen permits a background to be projected onto a subject being photographed without the background being perceptible where it strikes the subject being photographed. The autocollimating screen per se is not claimed in the present application; however, the apparatus making the use of an autocollimating screen extremely practical has been described in detail. Prior to the use of the autocollimating screen, a background had to be projected onto the rear of a translucent screen, and applicant's novel apparatus permits all components to be mounted on a single optical platform forwardly of the reflecting surface of the screen.

Contrary to the use of synchronized flood lights, flash bulbs,, "trial and error" etc., the present invention incorporates on a single optical platform a readily adjustable and adjusted relationship between focal and reflection axes that promotes efficiency and eliminates substantially all "trial and error." Focusing of the projector lens, orienting of the mirror 54, focusing the projection lens 76 and transparency holder 96 generally have to be accomplished only once.

The transparencies can be readily interchanged and certain portions of the "background" of the transparency can be readily selected. The light trap 68 substantially prevents scattering of light rays penetrating mirror 54 so that these light rays will not affect the picture being viewed by the camera lens 44.

The novel optical arrangement is susceptible for use in all types of photography. Through the ready interchangeability of "background" slides T many different backgrounds can be tried when composing a composite photograph.

The pilot light means 136 of the light projection means 118 is used for initial composition of the picture and is of sufficient intensity to permit initial adjustment of the cooperating components. While the pilot light is used for a relatively long duration, the heat generated thereby is exhausted, so adjustments are uniformly maintained and radical expansion and contraction of the materials is minimized. The cooling of the pilot light means 136 is facilitated by the disposition of the mirror means 140, and the projector lens and transparency holder means are cooled due to their disposition in relation to open collar 124.

The flash light means 130 are used momentarily during exposure of the film, etc. via the camera means 42. The flash light means may comprise a xenon discharge tube or suitable equivalents. The use of the high intensity flash light means in conjunction with the pilot light means insures optimum photo composition, i.e. insures perfect lighting with minimum shadows, and once the optical axes are adjusted, subsequent adjustments for taking other pictures, even with a different background are practically nil.

The optical bench or platform maintains a constant inter-relation between the camera, semi-transparent mirror, projection lens, and light sources so that not only are photographs taken more rapidly than was heretofore possible, but more accurate and consistent photographs can be readily and expeditiously obtained.

It will be obvious to those skilled in the art that various changes may be made within the scope of the invention and therefore the invention is not limited to what has been shown and described in the illustrative disclosure.

What is claimed is:

1. In a system for producing composte pictures in combination with an autocollimating screen having a reflecting surface for reflecting light rays substantially in the direction of incidence,
   a stand including an optical platform for disposition in front of said reflecting surface;
   camera lens means on said platform having a focal axis for direction toward said reflecting surface;
   semi-transparent, mirror means on said platform having a reflection axis substantially intersecting the focal axis of said camera lens means and adopted to permit a picture to be viewed therethrough by said camera lens means;
   projection lens means on said platform having a focal axis adapted to intersect the intersection of the focal axis and reflection axis of said respective camera lens means and mirror means;
   light-projection means on said platform adjacent said projection lens means and having an opening for projecting light rays through said projection lens means;
   transparency holder means on said platform between said light-projection means and said projection lens means whereby a transparency background in said holder means will be projected through said projection lens means onto said mirror means for transmission onto the screen to provide a background for an object disposed before said screen when a composite scene is being composed;
   said light projection means comprising a housing, including pilot-light means, flash-light means and second semi-transparent mirror means therein, said pilot-light and flash-light means positioned on opposite sides of said second mirror means and having intersecting light-emission axes, said second mirror means including a reflection axis adapted to substantially coincide with the focal axis of said projection lens means and the intersection of said light emission axes;
   whereby pilot-light means energization is used for initially adjusting said projection lens means at optimum focus to attain optimum transparency projection and subsequent flash-light means energization attains optimum transparency projection, and all adjusted components remain in substantially adjusted interrelation for subsequent transparency projection.

2. The system as claimed in claim 1 in which the light emission axes of said pilot light and flash light means are disposed at right angles with respect to each other, and said light emission axis of said flash light means substantially coincides with the reflection axis of said second mirror means.

3. The system as claimed in claim 1 in which said housing includes air draft creating means therein for drawing cooling air past said projection lens means, transparency holder means and said pilot and flash light means for prevention of expansion of the components and maintaining the focused adjustment of the projection lens means.

4. The system as claimed in claim 1 including light trap means on said platform in opposed relation to said projection lens means and offset from the intersection of the focal axes of said projection lens means and the reflection axis of said semi-transparent mirror means whereby light rays passing through said semi-transparent mirror means is substantially absorbed.

5. The system claimed in claim 1 in which said projection lens means includes means for adjusting its distance with respect to said transparency holder means.

6. The system as claimed in claim 1 in which said transparency holder means includes means for adjusting the same with respect to said projection lens means.

7. In a system for producing composite pictures in combination with an autocollimating screen having a reflecting surface for reflecting light rays substantially in the direction of incidence,
- a stand including an optical platform for disposition in front of said reflecting surface;
- camera lens means on said platform having a focal axis for direction toward said reflecting surface;
- semi-transparent, mirror means on said platform having a reflection axis substantially intersecting the focal axis of said camera lens means and adapted to permit a picture to be viewed therethrough by said camera lens means;
- projection lens means on said platform having a focal axis adapted to intersect the intersection of the focal axis and reflection axis of said respective camera lens means and mirror means;
- light-projection means on said platform adjacent said projection lens means and having an opening for projecting light rays through said projection lens means;
- transparency holder means on said platform between said light-projection means and said projection lens means whereby a transparency background in said holder means will be projected through said projection lens means onto said mirror means for transmission onto the screen to provide a background for an object disposed before said screen when a composite scene is being composed;
- said light projection means comprising a housing, including pilot-light means, flash-light means and second mirror means therein, said pilot-light and flash-light means positioned on opposite sides of said second mirror means and having intersecting light-emission axes, said second mirror means being pivotally supported in said housing on an axis laterally disposed with respect to the intersection of the light emission axes of the respective lights whereby the second mirror means can be displaced out of the light-emission axes of the flash-light means when a finally composed composite picture is to be viewed by said lens means, said second mirror means including a reflection axis when in the non-displaced position adapted to substantially coincide with the focal axis of said projection lens means and the intersection of said light-emission axes;
- whereby pilot-light means energization is used for initially adjusting said projection lens means at optimum focus to attain optimum transparency projection and subsequent flash-light means energization attains optimum transparency projection, and all adjusted components remain in substantially adjusted interrelation for subsequent transparency projection.

References Cited
UNITED STATES PATENTS

| | | | |
|---|---|---|---|
| 2,256,385 | 9/1941 | Evans et al. | 88—24 |
| 2,282,045 | 5/1942 | Fleischer | 95—44 |
| 2,292,044 | 8/1942 | Bucky | 88—24 |
| 2,697,392 | 12/1954 | Zimberoff et al. | 95—11.5 |
| 2,727,427 | 12/1955 | Jenkins | 352—89 |
| 2,727,429 | 12/1955 | Jenkins. | |
| 3,039,357 | 6/1962 | Eagle | 95—83 X |
| 3,085,470 | 4/1963 | Berger | 88—28.9 X |
| 3,227,509 | 1/1966 | Baker | 88—24 |

FOREIGN PATENTS

| | | |
|---|---|---|
| 768,394 | 2/1957 | Great Britain. |

JULIA E. COINER, *Primary Examiner.*